United States Patent [19]

Vigneaux et al.

[11] Patent Number: 5,852,435
[45] Date of Patent: Dec. 22, 1998

[54] DIGITAL MULTIMEDIA EDITING AND DATA MANAGEMENT SYSTEM

[75] Inventors: Stevan Vigneaux, Bolton; Blair F. Wheeler, Winchester, both of Mass.; Philip Mason, Nashua, N.H.; Richard M. Pierceall, Half Moon Bay, Calif.; Adrian Scott, Coleford, England; Roland J. Boucher, Jr., Weston; William C. Morrison, Wayland, both of Mass.; Richard D. Hennessy, Nashua, N.H.

[73] Assignee: Avid Technology, Inc., Tewksbury, Mass.

[21] Appl. No.: 631,441

[22] Filed: Apr. 12, 1996

[51] Int. Cl.⁶ .................................................... G06T 1/00
[52] U.S. Cl. .................... 345/302; 370/229; 345/433; 345/202; 348/384
[58] Field of Search .................................... 345/302, 433, 345/327–332, 340, 132, 428, 202, 154; 395/200.77; 348/384, 6–8, 568, 392, 423; 370/229–238

[56] References Cited

U.S. PATENT DOCUMENTS

| | | | |
|---|---|---|---|
| 5,012,334 | 4/1991 | Etra | 358/102 |
| 5,237,648 | 8/1993 | Mills et al. | 345/433 |
| 5,274,758 | 12/1993 | Beitel et al. | 345/302 |
| 5,404,316 | 4/1995 | Klingler et al. | 707/530 |
| 5,442,744 | 8/1995 | Piech et al. | 345/302 |
| 5,493,568 | 2/1996 | Sampat et al. | 370/60 |
| 5,513,306 | 4/1996 | Mills et al. | 707/530 |
| 5,613,057 | 3/1997 | Caravel | 345/302 |
| 5,623,308 | 4/1997 | Civanlar et al. | 348/392 |
| 5,659,793 | 8/1997 | Escobar et al. | 345/302 |
| 5,664,216 | 9/1997 | Blumenau | 345/302 |
| 5,682,326 | 10/1997 | Klingler et al. | 345/302 X |

*Primary Examiner*—Joseph H. Feild
*Attorney, Agent, or Firm*—Wolf, Greenfield & Sacks, P.C.

[57] ABSTRACT

A digital multimedia newsroom production system allows users of the system to create, browse and catalog multimedia assets. The system includes a journalist workstation for accessing multimedia assets stored in a multimedia archive to create a multimedia storyboard of a news story to be broadcast from the system. The storyboard includes frames of video retrieved from one or more sources, and text retrieved from one or more sources or generated by a user of the journalist workstation. In one embodiment of the invention, multimedia data captured by the newsroom production system undergoes a dual digitization process to create a high resolution version of the media data and a low resolution version of the media data. The low resolution version of the media data can be efficiently stored in the system and may be transmitted over a low-bandwidth network to the journalist workstation for use in the creation of a storyboard.

8 Claims, 3 Drawing Sheets

DIGITAL MULTIMEDIA EDITING AND DATA MANAGEMENT SYSTEM

BACKGROUND OF THE INVENTION

1. Field of the Invention

The present invention relates generally to an audio/video data management and editing system, and more particularly, to a method and apparatus for editing and managing multimedia data in a multimedia production environment.

2. Discussion of the Related Art

The process for producing broadcast news programs has undergone several changes over the last few decades. Changes in available technology, as well as increased competition brought about by the expansion of cable outlets and other news sources, have forced news broadcasters to use their resources more effectively while striving to differentiate their programming.

In a typical news production operation, there are four major processes that must occur to produce a news program. These processes are identified in FIG. 1. and include video production 10, graphics production 12, text production 14 and on-air operations 16. The results of these processes are rarely effectively combined until the actual broadcast of the news program. The video production process 10 includes the generation and editing of tape-based video for broadcast using videotape retrieved from a videotape archive or produced from one or more sources (i.e. cameras, either studio or field recorded). The text production process includes the scripting and editing of text gathered from several sources including a text archive. Similar to the tape production process and the text production process, the graphics production process 12 includes the generation and editing of graphics data gathered from several sources.

In order to produce the final news product for broadcast, the results of the video production process 10, the graphics production process 12 and the text production process 14 must be properly integrated during the on-air operations to produce the finished product.

Existing news broadcast systems provide the capability for the integration of the video production process, the graphics production process and the on-air operations to provide complete management of audio and video elements of the news program from acquisition, through editing. distribution and on-air play. An integrated process in accordance with one such system is shown in FIG. 2. As shown in FIG. 2. a disk-based video production process is integrated with a media production process 32 and on air operations 34. The use of disk-based digital audio/video storage systems, digital networks, and digital non-linear editing systems has allowed for successful integration of the video production, graphics production and on-air operations. Several products are available from Avid Technology, Inc., Tewksbury, Mass., for providing the integration shown in FIG. 2.

The newsroom text production and management system 24 of FIG. 2 is the same text production and management system shown in FIG. 1. Although newsroom computer systems have been in use for over 15 years, these computer systems are predominately text based, and have limited integration capabilities with tape-based or disk-based audio/video production systems. Newsroom computer systems have typically grown out of systems which were developed to receive news agency copy and provide simple word processing and communications facilities. In more recent years, add-ons of various kinds have been developed which provide some integration of the text production process with the audio/video production process. However, only limited integration of the text and audio/video data has been achieved, thereby providing only limited multimedia capability.

In known prior art systems, when a journalist in a newsroom is preparing a story and wishes to incorporate video from a previous broadcast that is contained in a video tape archive, the journalist must request that the tape be retrieved manually, and must then review the tape in an edit bay or a similar location. Although the journalist does not typically prepare the final edited audio/video tape for broadcast, the journalist may wish to view archived video, video of recent events, text or graphics received over news wire services, and archived text to perform preliminary editing of this material in order to prepare an integrated story for broadcast. In present day systems, the capability to perform the above-identified functions is not available to the journalist in the newsroom system, but as discussed above, must be performed remote to the newsroom, for example, in an edit bay.

SUMMARY OF THE INVENTION

In one embodiment of the present invention, a digital multimedia newsroom production system is provided that allows users of the system to create, browse, and catalog multimedia assets. In a preferred embodiment of the system, a journalist workstation is provided that allows a user of the workstation to access multimedia assets stored in a multimedia archive. A user of the journalist workstation can create a storyboard of a multimedia product for broadcast. The storyboard may include frames of low resolution video from several different sources, text from several sources such as news wire copy, archived text, and text created by the user while creating the story board, graphics, audio, still pictures, and any other form of multimedia data.

In a preferred embodiment of the present invention, multimedia data captured by the newsroom production system undergoes a dual digitization process to create a high-resolution version of the media data and a low resolution version of the media data. The low resolution media data can be efficiently stored and may be transmitted over a low-bandwidth network to the journalist workstation for use by a journalist in creating a storyboard. Meta-data associated with the low resolution media data and the high resolution media data have common identifiers so that an editor of the final broadcast version of the multimedia data can view and edit a high resolution version of the storyboard created by the journalist using the low resolution data. In the preferred embodiment of the present invention, the translation of the low resolution version of the video storyboard to the high resolution version is transparent to a user of the system.

In another embodiment of the present invention a workstation graphics user interface includes multiple display windows for displaying and manipulating a storyboard. In a preferred embodiment, the storyboard includes: a viewing window for displaying real-time video; a clipnotes window for displaying text entered by a user of the system to describe a video clip in the viewing window; a storyboard window for displaying a number of video clips and subclips selected by the user of the workstation; a storynotes window for displaying notes generated by the user describing the story to be depicted by the video clips in the storyboard window; and a script window for displaying a broadcast script generated by the user corresponding to the story depicted on the storyboard. In the preferred embodiment, the viewing window includes machine controls and edit buttons for controlling and editing the video displayed in the viewing window.

BRIEF DESCRIPTION OF THE DRAWINGS

For a better understanding of the present invention, reference is made to the accompanying drawings which are incorporated herein by reference and in which.

DETAILED DESCRIPTION

Figure 1:
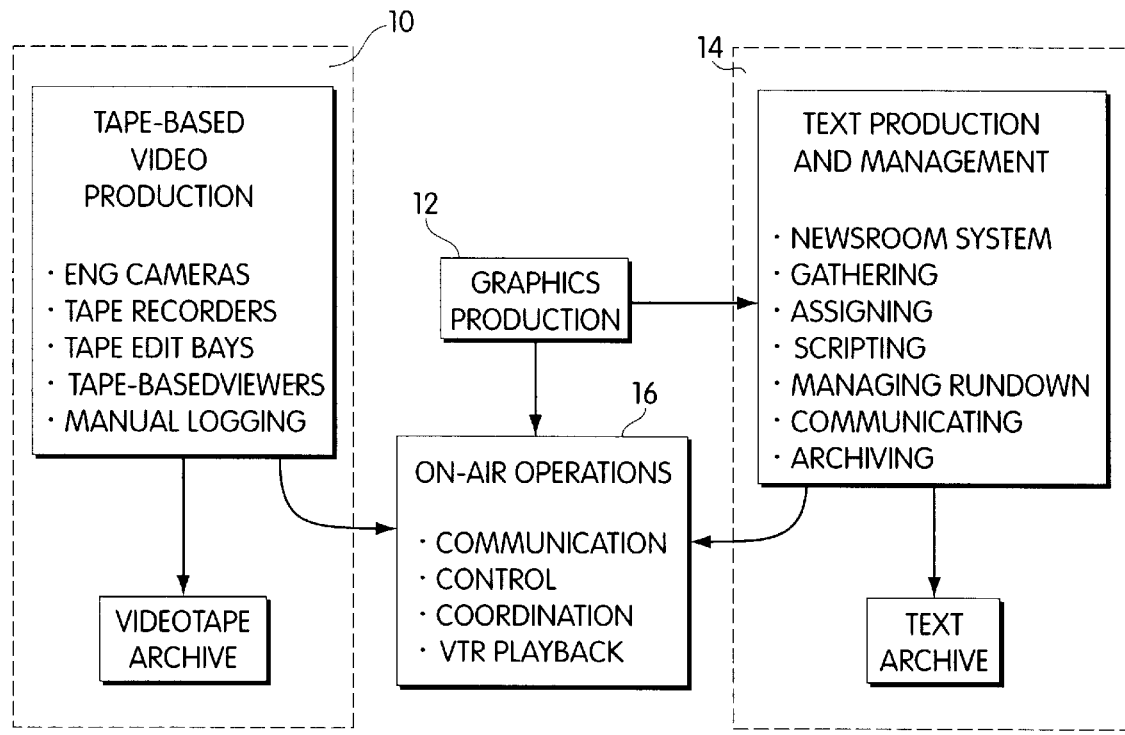
FIG. 1 is a block diagram of traditional processes that occur in a typical television news operation.
Figure 2:
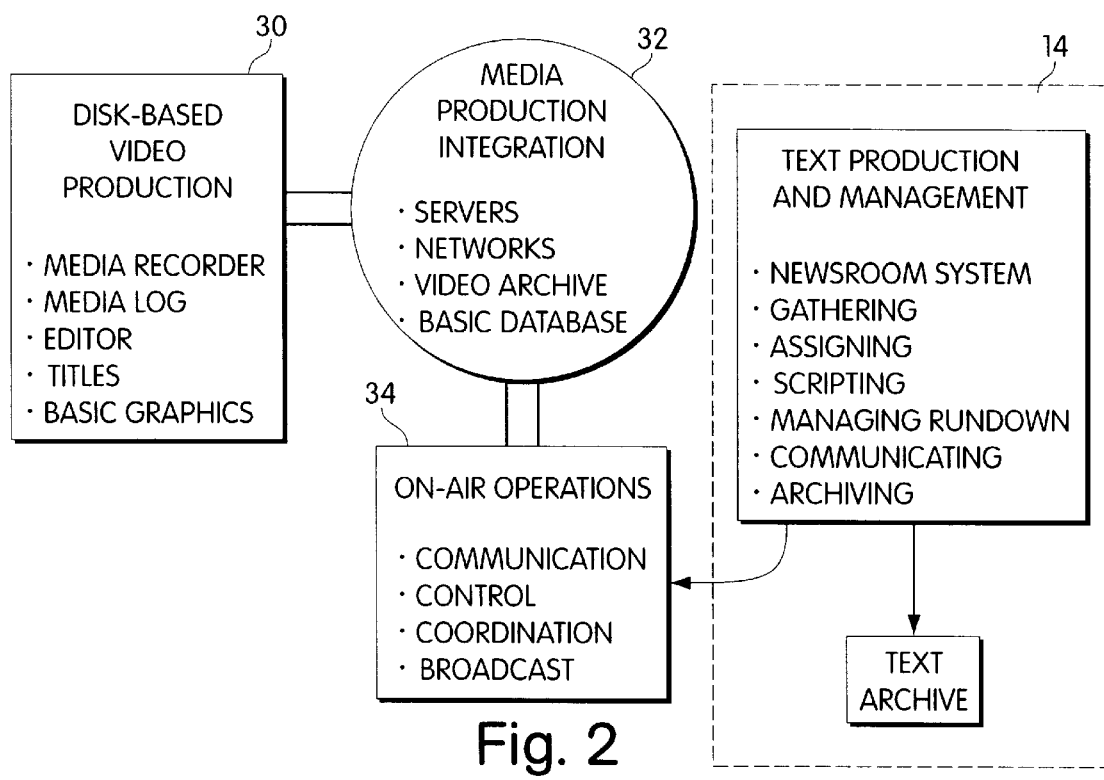
FIG. 2 is a block diagram of the processes that occur in a typical television news operation having audio/video production capabilities integrated with on-air operations.
Figure 3:
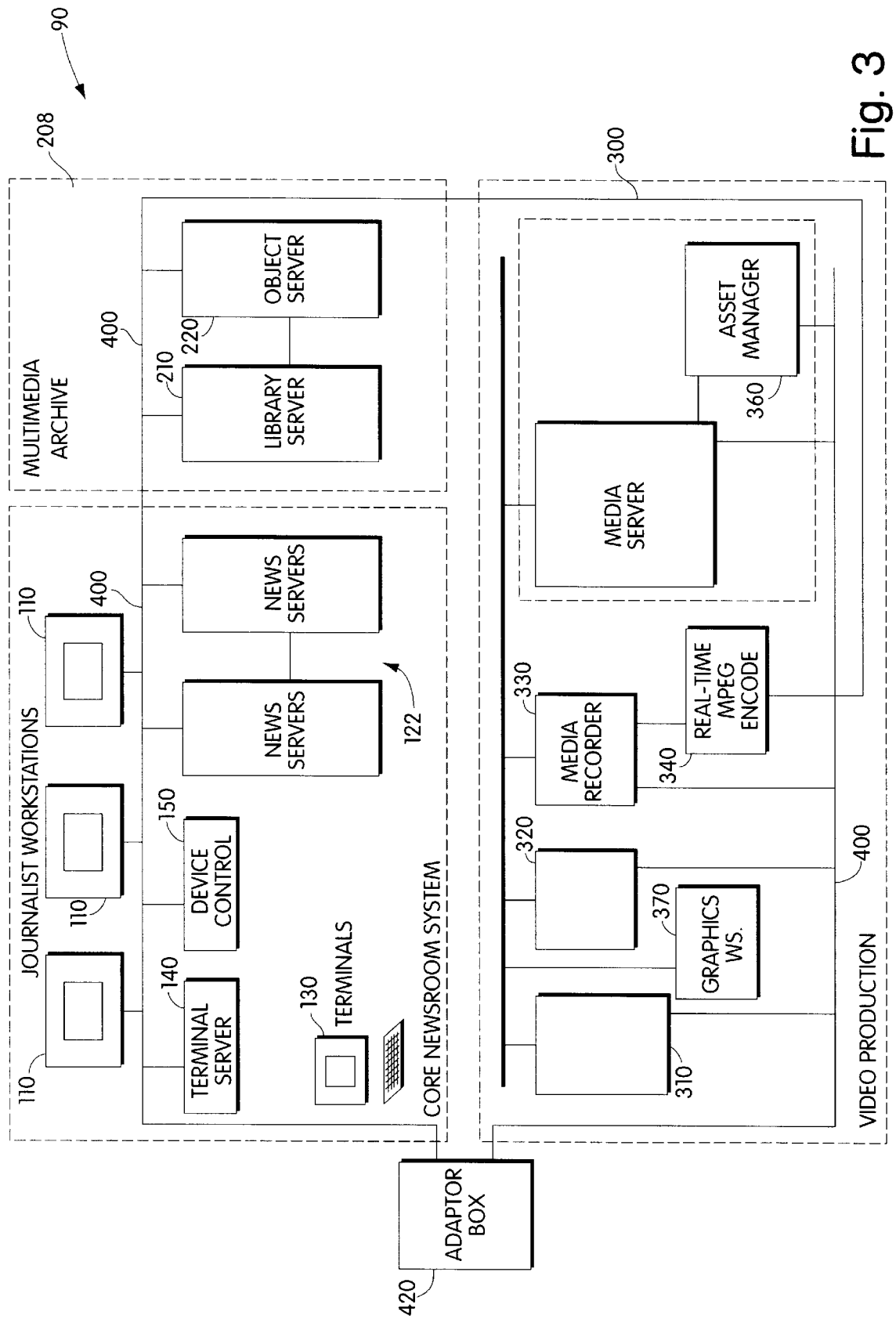
FIG. 3 is a block diagram of a digital multi-media newsroom production system in accordance with one embodiment of the present invention.

FIG. 3 shows a digital multimedia newsroom production system 90 in accordance with one embodiment of the present invention. The system provides a completely digital, networked, multimedia news production and display system. The system 90 shown in FIG. 3 includes three major systems, a core newsroom system 100, a multi-media archive 200, and a video production system 300.

The components of the core newsroom system and the multimedia archive are interconnected using a first digital network 400. The components of the video production system are interconnected with a second digital network 410. An adaptor box 420, connected to the digital networks, provides communication between the networks. In a preferred embodiment of the present invention, the first digital network is implemented using an Ethernet system having a data rate equal to, or greater than, 100 Mb/s and the second digital network is implemented using an Ethernet system having a data rate equal to, or greater than, 10 Mb/s. The adaptor box 420 may be implemented using one of a number of commercially available products such as a FastNet 10 available from Cabletron Systems, Inc, Rochester, N.H. In an alternate embodiment of the present invention, the first and second networks may be implemented using one 100 Mb/s network. In this alternate embodiment, the adaptor box 420 is not used.

Each of the major components of the system are described in greater detail below.

Video Production System

The video production system 300 provides audio/video capture, media data editing, and management and control of high quality multimedia data suitable for broadcast. Multimedia data is defined as any form of information that can be represented in a digital form. The video production system includes a digital playback system 310. a video editor 320. a media recorder 330 connected to an MPEG encoder 340, a media server 350 including an asset manager 360, a high bandwidth data network 364, and a graphics workstation 370.

The media server is a large scale computer that stores and delivers high quality audio and motion JPEG video (MJPEG), suitable for broadcast, in conjunction with the other devices of the video production system. The media server can also function as an archive system for multimedia data produced in the video production system. In a preferred embodiment of the present invention, additional near-line storage and off-line storage is provided on a digital data storage medium, such as tape or optical disks, to relieve the media server of archive responsibilities to provide additional on-line storage capabilities within the media server.

An asset manager 360 is an integral part of the media server and is implemented as software in the media server. The asset manager stores information and is the tool used to manage the data stored in the near-line storage and the off-line storage. The material stored in the media archive can be automatically moved to on-line status on the media server by the asset manager. The asset manager contains search support data for locating media objects stored in the media server, in the near-line storage system and in the off-line storage system. The asset manager also contains composition information that can be used to capture, edit, and play back the media objects stored in the media server. As described below in greater detail, the media server also provides translation of low resolution media data compositions, generated within the core newsroom system, to high resolution media data compositions for editing and playback within the video production system. In a preferred embodiment, the media server is implemented using an Avid MediaServer™ available from Avid Technology, Inc., Tewksbury, Mass.

The media recorder 330 is a disk-based digital recording workstation which is used to capture audio/video data and provide digitization and compression of the audio/video data. The media recorder digitizes, compresses and records audio/video material and transmits the digitized compressed data to the media server over the high speed network for storage on the media server.

In a preferred embodiment of the present invention, the media recorder uses an MJPEG encoding scheme to generate high quality, high resolution, compressed digital data suitable for broadcast. In the preferred embodiment, an MPEG encoder 340 is coupled to the media recorder 330 to also provide MPEG compression capability. As described in greater detail below, the addition of the MPEG encoder to the media recorder provides the system with a dual-digitizing capability for media data recorded by the media recorder. The MPEG encoder provides greater compression of the data than the media recorder, thereby allowing the data to be efficiently transmitted over the Ethernet network 400 to be played on the journalist workstations 110. As shown in FIG. 3 the MPEG encoder has a direct connection to the digital network 400 to provide MPEG encoded media data to the multimedia archive.

In a preferred embodiment, the media recorder is implemented using an Avid Media Recorder™ available from Avid Technology Inc., Tewksbury , Mass.

The video editor 320 is a full-feature, digital, non-linear video editing workstation specifically tailored to provide functions for news editing. The video editor provides editing of high resolution broadcast quality images provided by the media server 350. In a preferred embodiment, the video editor is implemented using a an Avid NewsCutter™ or an Avid Media Composer®, both of which are available from Avid Technology Inc., Tewksbury, Mass.

The digital playback system 310 is a digital, disk-based playback system that manages the broadcast to air of multimedia data produced and stored within the video production system. The digital playback system plays materials stored either locally or on the media server 350 in accordance with play lists generated from a program lineup created on one of the journalist workstations within the core newsroom system, or on a workstation directly coupled to the video production system (not shown). In a preferred embodiment of the present invention, the digital playback system is implemented using an Avid AirPlay® available from Avid Technology, Inc., Tewksbury, Mass.

The high bandwidth network 364 provides high speed communication between the components of the video production system. In a preferred embodiment of the present invention, the high bandwidth network is implemented using an ATM network as described in co-pending U.S. patent application Ser. No. 08/249,849, titled An Apparatus and Computer Implemented Process For Providing Real-Time Multimedia Data Transport in a Distributed Computing System, which is incorporated herein by reference. The high bandwidth network 360 supports real time playback of broadcast quality MJPEG video and multi-track audio over fiber optic networks.

The graphics workstation 370 is used for generating and editing graphics material for broadcast from and storage in the video production system. In a preferred embodiment, the graphics workstation 370 is implemented using a Matador Workstation available from Avid Technology, Inc., Tewksbury, Mass.

The Core Newsroom System

The core newsroom system 100 consists primarily of a number of journalist workstations 110 and a pair of news servers 120. FIG. 3 shows a newsroom system having three journalist workstations 110. In embodiments of the invention, the number of workstations actually used may be much greater than three, and the actual number of journalist workstations that may be used in the system is based on several factors including the amount of network activity generated by each user of the workstations and by the amount of delay each user will tolerate in accessing the system.

In a preferred embodiment of the present invention, each of the journalist workstations 110 is implemented using an MPC III compliant workstation.

The journalist workstation provides access to multimedia data from a variety of sources and includes the tools (i.e. software) necessary to create a multimedia storyboard of a news story for broadcast. The multimedia data available to the journalist includes the low resolution MPEG video data captured by the media recorder. In one embodiment of the present invention each of the journalist workstations includes a video port for receiving video from, for example, a video tape recorder. Each of the journalist workstations also includes a serial port for controlling the video tape recorder. The graphics user interface of the journalist workstation and the functions available to a user of the journalist workstation are described in greater detail below.

The news server 120 provides the management and storage of multimedia data in the newsroom environment. The news servers are configured as distributed processors with mirrored data bases to provide maximum reliability and performance. Other centralized functions, such as communications functions, are managed by the news servers 120. In a preferred embodiment, the news servers are implemented using an Avid NewsServer available from Avid Technology, Inc., Tewksbury, Mass. The news servers have external connections 122 for providing access to news wire services and to allow remote access to the news server from users external to the core news room system.

The core newsroom system 100 may also include one or more terminal servers 140 to provide connection to the digital network 400 for user terminals 130. The user terminals may be one of several different terminals used in prior art systems primarily for text processing and communications functions. A device controller 150, or a number of device controllers 150, may also be coupled to the digital network 400 to provide control of several multimedia devices, such as teleprompters, from the journalist workstations.

Multimedia Archive

The multimedia archive (MMA) consists of a library server 210 and one or more object servers 220. The library server holds catalog and search support meta data for locating objects stored in the multimedia archive.

The object server provides the primary storage media for browsing and archival of material generated during news gathering and production processes. The object server works in conjunction with the library server to facilitate distribution of multimedia material to the journalist workstations. The objects stored in the multimedia archive can be low resolution versions of video audio, graphics, and text. The MMA can be used to store finished stories, audio, video and other content for reuse in creating new stories. In a preferred embodiment, the multimedia archive 200 is implemented using the IBM Digital library 5765-258.

The operation of the digital multimedia newsroom production system 90 Shown in FIG. 3 is described below. The operation of the system can be described as a collection of distinct function specific workloads characterized at a high level as asset creation, asset use, asset storage, and asset administration. The system provides the capability for the following functions:

News wire text capture, storage, and catalog;

News story text creation, storage, and catalog;

High resolution video capture, edit, playout, storage and catalog;

Video production system low resolution media data editing;

Real-time dual resolution digitization, storage and catalog;

Low resolution video browsing and editing;

High-resolution playout and editing of low resolution composition;

Each of the functions described above, along with user interfaces for accomplishing these functions, are described below in greater detail.

News Wire Text Capture, Storage and Catalog

The news servers 120 provide capability for capture and storage of news wire text data through the external interfaces 122. News wire text stories are captured by the news servers and cataloged in a database of the news servers. A user of one of the journalist workstations may access the news servers' databases as a system librarian to search, browse and retrieve the wire service data stored in the databases of the news servers. It is not generally necessary to store all text stories captured by the news servers in the multimedia archive 200. A system administrator may access the news servers through one of the journalist workstations, browse the catalog of data received from the news wires, determine what stories are appropriate for storage in the multimedia archive and command the news servers to transfer selected data to the multimedia archive for storage.

News Story, Create, Storage, and Catalog

A user of the journalist workstation can access text through the news servers 120 and can create text and scripts from scratch or can use existing text and scripts stored in the news servers or in the multi-media archive in the creation of text and scripts. The user can search, browse and retrieve text data stored in the news servers 120 and the multi-media archive 200. The user can perform this searching and browsing using complex, full-text search techniques, thereby allowing efficient research by focusing the searching to retrieve data specifically relevant to the user's needs.

High Resolution Video Capture, Edit, Playout, Storage and Catalog

High resolution media data utilized by the video production system is captured in the system by the media recorder 330. The high resolution media data is captured in the media recorder, digitized and compressed using a broadcast quality compression technique such as MJPEG. The media data captured by the media recorder is transferred in compressed form to the media server and is registered and stored in the media server by the asset manager 360. As discussed further below, in a preferred embodiment of the present invention, a low resolution version of the media data is simultaneously created with the high resolution media data.

The high resolution media data can be browsed and edited using the video editor 320 and can be broadcast to air using the digital playback system 310.

Video Production System Low Resolution Media Data Editing

As discussed above, low resolution video is used by the journalist workstations to provide limited editing capability. A user of the video production system, for example a user of the video editor 320, may wish to edit low resolution media data. The low resolution media data may either be a low resolution composition created by a user of a journalist workstation or a low resolution version of media data captured by the media recorder 330. In either case, the video production system user may search the multimedia archive 200 over the network 400 or may search the asset manager 360 over the network 400 to retrieve the low resolution media data. After editing the low resolution media data, the video editor 320 may transfer edited low resolution media data to the multimedia archive 200 for cataloging and storage therein.

Real-time Dual Resolution Digitization, Storage and Catalog

As described above, news video production from the journalist workstation requires that an editable form of media data be available to a user of the journalist workstation. The low resolution media data is stored in, cataloged by and retrieved from the multimedia archive 200. The low resolution media data is captured in the system using the media recorder 330. The media recorder 330 performs a dual resolution digitization of media data to be captured by the system.

When media data is captured, the media recorder 330, in conjunction with the MPEG encoder 340, performs a dual resolution digitization of the media data to simultaneously produce a high resolution version of the media data and a low resolution version of the media data. As discussed above, the high resolution version of the media data is digitized and compressed in a preferred embodiment using an MJPEG encoding format. The low resolution video is compressed in a preferred embodiment using known, high compression encoding techniques such as MPEG or Quick Time, available from Apple Computer, Inc, Cupertino, Calif. Although it is preferred to use either MPEG or Quick Time, another compression technique which results in a high compression ratio of the media data may also be used. By performing simultaneous capture of both the high resolution version and the low resolution version of the media data, both forms of media data are immediately available in the system so that story editing can be performed to meet the stringent deadlines encountered in broadcast news operations even with late breaking material.

Journalist Workstation Low Resolution Video Browsing and Editing

One of the primary features of the system shown in FIG. 3 is the ability to provide a user of the journalist workstations with low resolution video to allow browsing and editing of the low resolution video to create storyboards which may ultimately be used by an editor using the video editor 320 to create broadcast quality media data. The low resolution editing feature allows the journalist to become more involved in the finished media product and to incorporate archived media data into storyboards without the need for manual retrieval of video tapes and operation of a video tape player in an edit bay as in previous systems.

A journalist, using the journalist workstation, can search the data contained within the library server 210 of the multimedia archive 200 for low resolution video data, audio data and text related to a story that the journalist is composing on the journalist workstation. In response to key search words provided by the journalist, the multimedia archive provides a list of material contained therein related to the key words. The journalist can then select media data for browsing, or editing on the journalist workstation from the list of material.

Figure 4:
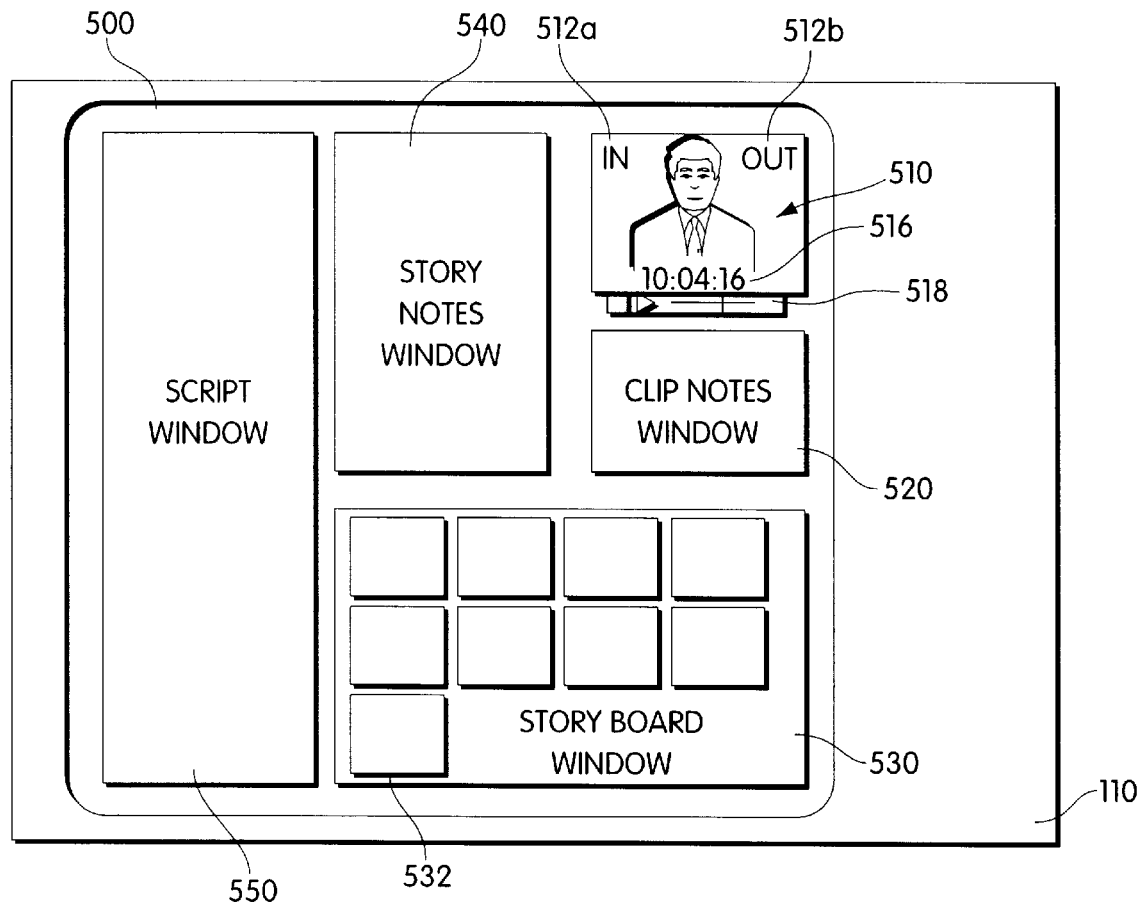
FIG. 4 is a block diagram of a user interface of a digital multi-media newsroom production system in accordance with one embodiment of the present invention.

The graphics user interface for storyboard creation provided to the journalist at the journalist workstation 110 is shown in FIG. 4. The user interface 500 includes a number of windows including a viewing window 510, a clipnotes window 520, a storyboard window 530, a storynotes window 540 and a script window 550.

The script window 550 provides an area in which the journalist can write the main script of a story being composed on the journalist workstation. Text can be generated in this window using standard word processing commands. Graphics, including painting functions, can be performed on the journalist workstation and incorporated into the storyboard.

The viewing window 510 displays a low resolution video component of low resolution media data to be viewed and edited on the journalist workstation. The viewing window also displays the time code 516 of the video being displayed, machine controls 518, and editing functions such as mark in 512*a* and mark out 512*b* buttons. The machine controls 518 provide controls for playing a video clip in the viewing window and are similar to standard VTR controls. The machine controls can be selected by the user using a pointing device, such as a mouse, or by using special function keys on a keyboard of the journalist workstation. Selecting a clip for display in the viewing window may be done by dragging a clip from the storyboard window 530 (described below) or by selecting a new clip from the multimedia archive.

A second viewing window can be opened on the screen at the same time as the viewing window 510. The second viewing window, in a preferred embodiment, is made visible by either shrinking or eliminating the storynotes window 540.

The mark in button 512*a* and the mark out button 512*b* are super-imposed in the upper left and upper right corners of the viewing window. These buttons are used to perform editing functions at the journalist workstation. When a video clip is being played in the viewing window 510, audio data associated with the video data is played on speakers of the journalist workstation. A "video only" or "audio only" indication will appear on the video window when the media data being displayed or played on the workstation consists of audio only or video only.

The clipnotes window 520 provides a notepad for entry of short notes for each clip viewed on the viewing window 510. The storynotes window 540 provides an area for the entry of notes that apply to the whole story to be edited as opposed to the clipnotes window 510 which is for notes on individual clips.

The storyboard window 530 allows clips and subclips to be laid out in sequence. Each of, the clips 532 shown in the storyboard window 530 typically show the first frame of a corresponding clip, however, the user may select a frame other than the first frame to be shown in the storyboard window. The collection of clips stored in the storyboard window are referred to as a bin. The journalist has the option of playing one of the clips in the viewing window or playing the bin of clips as arranged in the storyboard window.

The final pre-edited composition contained on the journalist workstation may be transferred to the multimedia archive 200 for reuse by the journalist or other journalists on other journalist workstations and for final editing and playout by a user of the video production system.

High Resolution Playout and Editing of Low Resolution Compositions

A composition produced during a low resolution activity on a journalist workstation may be played out in different ways. A user of a journalist workstation may play the low resolution composition by retrieving the composition data from the multimedia archive, or a user of the video production system, for example a user of the video editor 320, may play and edit a high resolution version of the composition. The translation of the low resolution composition to its high resolution equivalent is transparent to the user of the video editor. The asset manager 360 using registration information of each of the low resolution sources used in the composition can identify the equivalent high resolution sources and translate the low resolution composition into its high resolution equivalent. Efficient translation by the asset manager requires a unique registration system for each of the clips stored within the system. Further, the registration method must include means for identifying the corresponding high resolution version of low resolution media data. A preferred registration method is described in detail further below.

An editor, using the video editor 330, receives the high resolution version of the low resolution composition created by the journalist, and can further edit the composition in broadcast quality format, to provide more precise editing cuts than accomplished by the journalist.

Figure 5:
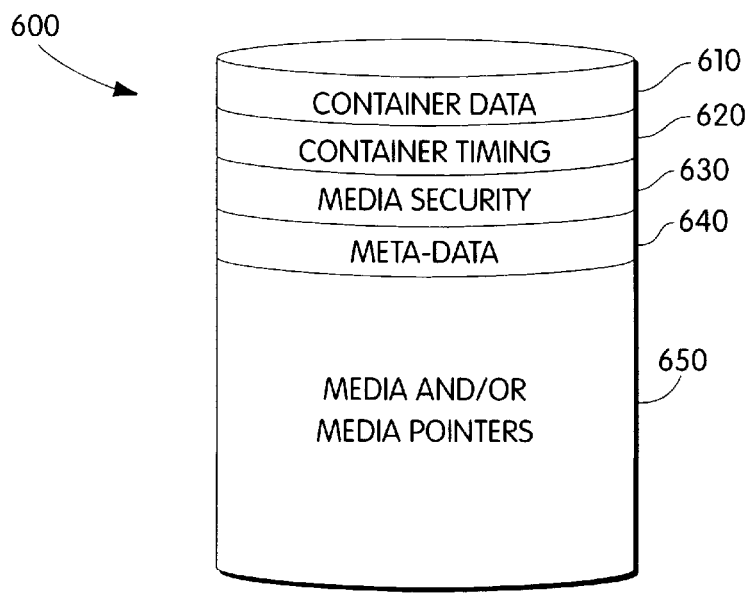
FIG. 5 is a diagram of a multi-media file structure in accordance with one embodiment of the present invention.

In order to provide efficient transmission and storage of media data in the system shown in FIG. 3, a standard file structure is used for the media data contained within the system. In one embodiment of the present invention, the media data is organized in a media container 600 as shown in FIG. 5. The media container 600 is divided into five subsections including container data 610, container timing 620, media security 630, meta data 640 and media or media pointers 650.

The information contained within the container data 610 describes the container itself and may include the following information: the name of the person that created the container data; the name of the person that approved the container data; an identification of the container security; a creation time stamp; the name of all people that have modified the data; a modification time stamp; a user's log; cost information associated with the data; and other user defined elements.

Container timing 620 includes information related to a relationship over time of the media in the container. This information is only applicable to a story being prepared for broadcast.

The media security segment 630 provides further information concerning the security level of the media contained within the container. This information can be used to restrict access to specified personnel of media contained within the container.

The meta data information describes the media stored in the container. In one embodiment, the meta data contains the following information for each media object in the container: the name of the person that approved the data; the name of the person that created the data; a creation time stamp; a media identifier; media status; media type; names of all people that have modified the data; a modification time stamp; a reference number; research descriptors; timing information; title; and other user defined elements.

The media and media pointers 65 are the actual raw data stored in the container. Media objects of many types may be stored in a single container. The media pointers point to a media object stored in another container. By storing a media pointer to another container, rather than the media of the other container itself, maximum storage efficiency can be attained throughout the system.

File structures, other than the container file structure described above, may be used for storing the media data in the digital multi-media newsroom production system. For example, the Open Media Framework (OMF™) file structure, described in Avid Technology, Inc. publication OMF™ Interchange Specification, which is incorporated herein by reference, may be used as the file structure for media files in the system. The structure described in Published PCT Application WO 93/21636, A Method and Apparatus For Representing and Editing Multimedia Compositions, incorporated herein be reference, may also be used in embodiments of the present invention.

Another feature of the system shown in FIG. 3 is the ability to uniquely identify the media objects stored within the system and to locate other versions of media data that correspond to the media objects. The ability of the system to locate a high resolution version of media data, corresponding to a low resolution version of the same media data, allows the asset manager to provide a high resolution translation of combinations or storyboards generated by the journalist workstation, such that the translation is transparent to an editor using the video editor 320.

The asset manager can uniquely identify the low resolution and high resolution media data in a number of ways. In one embodiment of the present invention, the media data, when captured by the media recorder 330, is assigned a unique time code stamp corresponding to the date and time that the media data is captured by the media recorder. Using this scheme, the low resolution version of the media data and the high resolution version of the media data is assigned the same identification number. However, since the low resolution media data is stored in the multimedia archive, and the high resolution media data is stored in the media server, there is no opportunity for confusion between the versions of the media data. The asset manager, in translating a combination or storyboard from a low resolution version to a high resolution version, can locate the high resolution version of each media object of the combination in the media server based on the identification number of the corresponding low resolution version of the media object. The above-described media data identifying method is not preferred for use at broadcast locations that do not maintain a unique timecode stamp.

In a preferred embodiment of the present invention, the asset manager includes Media File Manager (MFM) and Source Manager (SM) software as described in U.S. Pat. No. 5,267,351 to Reber et al which is incorporated herein by reference. This software provides a unique identifier to media data captured by the system and maintains a table of relationships between media objects contained within the system such that the asset manager can identify a corresponding version of low resolution or high resolution media data.

In an alternate embodiment of the present invention, a digital multimedia newsroom production system consists only of the core newsroom system 100 and the multimedia archive system 200 coupled by the digital network 400. In this alternate embodiment, a low resolution capture device is coupled to the network 400 to capture low resolution media data for storage in the news servers 120 and the multimedia archive system 200. In this embodiment, the journalist workstations provide the full storyboard functions described above with respect to the system 90 shown in FIG. 3.

Embodiments of the present invention overcome limitations of prior art systems by providing a fully integrated digital multimedia newsroom. In embodiments of the present invention, a journalist in a news room may create a multimedia storyboard of a news story which is electronically transferred over a digital network to an editing and production system for final editing and broadcast to air.

Embodiments of the present invention have been described with respect to a multimedia production system in a newsroom environment, however, embodiments of the present invention are not limited to a newsroom environment, but rather may be used in other multimedia environments as well, such as radio, and in the production of entertainment programming.

In embodiments of the present invention described above, the multimedia data processed on the journalist workstation has been described as low resolution multimedia data. The user interface provided by the journalist workstation may also be used to create storyboards using high resolution multimedia data.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description by way of example only, it is not intended as limiting. The invention's limit is defined only in the claims and the equivalents thereto.

What is claimed is:

1. A multimedia production system for browsing and editing multimedia data comprising:
    a media recorder that digitizes the multimedia data, the media recorder including:
        means for generating a first version of the multimedia data having a first video resolution; and
        means for generating a second version of the multimedia data having a second video resolution; and
        wherein the first video resolution is substantially different than the second video resolution;
    a multimedia storage device that stores the first version of the multimedia data and the second version of the multimedia data;
    a communication network coupled to the media recorder and to the multimedia storage device to transfer the first and second versions of the media data to the multimedia storage device;
    an asset manager for registering each version of the multimedia data using an identifier and for relating the identifiers of the first and second versions of the multimedia data;
    a first editing system connected to the multimedia storage device for creating a multimedia program using the first version of the multimedia data, wherein the first version of the multimedia data used in the multimedia program is specified using the identifier for the first version of multimedia data; and
    a second editing system connected to the multimedia storage device for creating the multimedia program using the second version of the multimedia data, including means for receiving the multimedia program created on the first editing system and for identifying, using the asset manager, the second version of multimedia data corresponding to the identifier specifying the first version of multimedia data used in the multimedia program.

2. The multimedia production system of claim 1, wherein the means for generating the second version of the multimedia data includes means for compressing the second version of multimedia data.

3. The multimedia production system of claim 2, wherein the second version of the multimedia data includes broadcast television quality resolution multimedia data.

4. The multimedia production system of claim 1, wherein the second version of the multimedia data includes broadcast television quality resolution multimedia data.

5. The multimedia production system of claim 1, wherein the first editing system includes means for editing scripts corresponding to the multimedia program.

6. The multimedia production system of claim 1, wherein the first video resolution is a lower resolution than the second video resolution.

7. The multimedia production system of claim 1, wherein means for generating the first version of the multimedia data includes means for compressing the multimedia data and wherein the first video resolution substantially different than the second video resolution by an extent of compression of the first version of the multimedia data.

8. The multimedia production system of claim 1, wherein the second editing system further comprises means for playing the multimedia program including means for substituting the identifier specifying the first version of multimedia data with an identifier specifying the second version of multimedia data.

* * * * *